(12) United States Patent
Grimm et al.

(10) Patent No.: US 7,541,409 B2
(45) Date of Patent: Jun. 2, 2009

(54) HYDROPHOBICALLY MODIFIED POLYMERS CONTAINING VINYLAMINE OR ETHYLENIMINE UNITS, METHOD FOR THE PRODUCTION THEREOF, AND THEIR USE AS RETENTION AGENTS

(75) Inventors: Guenther Grimm, Bruessel (BE); Volker Braig, Ladenburg (DE); Simon Champ, Ludwigshafen (DE); Norbert Mahr, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 557 days.

(21) Appl. No.: 10/513,788

(22) PCT Filed: May 19, 2003

(86) PCT No.: PCT/EP03/05233

§ 371 (c)(1),
(2), (4) Date: Jun. 20, 2005

(87) PCT Pub. No.: WO03/099880

PCT Pub. Date: Dec. 4, 2003

(65) Prior Publication Data

US 2005/0239974 A1    Oct. 27, 2005

(30) Foreign Application Priority Data

May 24, 2002    (DE)    ................................ 102 23 279

(51) Int. Cl.
   *D21H 17/33*    (2006.01)
   *C08F 26/00*    (2006.01)
   *C08F 26/02*    (2006.01)

(52) U.S. Cl. .............. 525/328.2; 162/164.1; 162/164.3; 162/164.6; 525/326.9; 525/328.4; 525/329.2; 525/329.4; 525/329.7; 525/329.9

(58) Field of Classification Search .............. 525/326.9, 525/328.2, 328.4, 329.2, 329.4, 329.7, 329.9; 162/164.1, 164.3, 164.6
See application file for complete search history.

(56) References Cited

U.S. PATENT DOCUMENTS

| | | | |
|---|---|---|---|
| 3,597,314 A | 8/1971 | Laube et al. | |
| 3,968,317 A | 7/1976 | Dumas | |
| 4,255,548 A | 3/1981 | Wingard, Jr. et al. | |
| 4,421,602 A | 12/1983 | Brunnmueller et al. | |
| 4,483,741 A | 11/1984 | Maloney et al. | |
| 4,578,515 A | 3/1986 | Dawson et al. | |
| 5,324,787 A | 6/1994 | Pinschmidt, Jr. et al. | |

FOREIGN PATENT DOCUMENTS

| | | |
|---|---|---|
| DE | 197 05 992 | 8/1998 |
| DE | 198 50 817 | 5/2000 |
| EP | 0 216 387 | 4/1987 |
| EP | 0 251 182 | 1/1988 |
| EP | 0 359 034 | 3/1990 |
| EP | 0 897 395 | 2/1999 |
| WO | 94 12560 | 6/1994 |
| WO | 98 32798 | 7/1998 |
| WO | 98 50630 | 11/1998 |
| WO | 01 40578 | 6/2001 |

OTHER PUBLICATIONS

Fischer, Thomas et al. "Synthesis of polyvinylamine and polymer analogous reactions", Macromol. Chem. Phys. vol. 195, pp. 679-687 1994.

*Primary Examiner*—Ana L Woodward
(74) *Attorney, Agent, or Firm*—Oblon, Spivak, McClelland, Maier & Neustadt, P.C.

(57) ABSTRACT

Hydrophobically modified polymers containing vinylamine or ethylenimine units and obtainable by reacting
(a) polymers containing vinylamine or ethylenimine units with
(b) compounds of the formula $$R\text{-}A\text{-}(EO, PO, BuO)_n\text{—}X \qquad (I),$$

where
R is $C_4$- to $C_{26}$-alkyl or $C_4$- to $C_{26}$-alkenyl,
A is O, NH or COO,
EO is an ethylene oxide unit,
PO is a propylene oxide unit,
BuO is a butylene oxide unit,
n is from 1 to 250 and
X is a functional group which can be covalently bonded to an OH group,
process for the preparation of hydrophobically modified polymers containing vinylamine or ethylenimine units by reacting polymers containing vinylamine or ethylenimine units with a water repellent of the formula I and use of the polymers thus obtainable as an additive to paperstock in papermaking.

8 Claims, No Drawings

HYDROPHOBICALLY MODIFIED POLYMERS CONTAINING VINYLAMINE OR ETHYLENIMINE UNITS, METHOD FOR THE PRODUCTION THEREOF, AND THEIR USE AS RETENTION AGENTS

CROSS REFERENCES TO RELATED APPLICATIONS

This application is a national stage application of International Patent Application No. PCT/EP03/05233, filed on May 19, 2003, and claims priority to German Patent Application No. 102 23 279.2 filed on May 24, 2002, both of which are incorporated herein by reference in their entireties.

The present invention relates to hydrophobically modified polymers containing vinylamine or ethylenimine units, processes for their preparation by reacting polymers containing vinylamine or ethylenimine units with a water repellent and the use of the water repellent polymers as retention aids.

Polymers containing vinylamine units are known. They are prepared, for example, by polymerization of acyclic N-vinylcarboxamides, such as N-vinylformamide, and subsequent hydrolysis of the polymers by the action of acids or bases, cf. U.S. Pat. Nos. 4,421,602, 3,597,314, 4,578,515 and 4,255,548. Partially hydrolyzed polyvinylformamides which contain from 90 to 10% of vinylamine units are used, according to U.S. Pat. No. 4,421,602, as retention aids, flocculants and drainage aids in papermaking.

EP-B-0 216 387 discloses the use of copolymers containing vinylamine units as dry strength agents for paper. The copolymers are prepared by hydrolysis of copolymers of N-vinylformamide and comonomers such as vinyl acetate, vinyl propionate, alkyl vinyl ethers, N-vinylpyrrolidone and/or esters, nitriles or amides of acrylic acid or methacrylic acid.

EP-B-0 251 182 discloses copolymers which contain N-vinylformamide, vinylamine and acrylonitrile units and, if required, small amounts of acrylamide and acrylic acid units.

Modified polyvinylamines are also known. Thus, the reaction of polyvinylamine with aliphatic acyl chlorides is described, for example, in Macromol. Chem. Phys., Volume 195 (1994), 679. U.S. Pat. No. 6,184,310 discloses polymers which contain carbamate units and are prepared by reacting polymers containing polyethylenimine or vinylamine units with haloformic esters. The haloformic esters may have long-chain alkyl or alkylphenyl radicals.

U.S. Pat. No. 5,324,787 discloses hydrophobically modified polyvinylamines and hydrophobically modified copolymers containing vinylamine units. They are obtainable by reacting the amino groups of the vinylamine units with $C_1$- to $C_{18}$-alkyl glycidyl ethers and are used as retention aids for fines in papermaking.

Other hydrophobically modified polymers containing vinylamine units are disclosed in EP-B-0 897 395. These are polymers which contain β-hydroxyalkylvinylamine units and are obtainable by reaction of polymers having vinylamine units with long-chain epoxides. The reaction products thus obtainable are used, for example, as retention aids, drainage aids and flocculants and as fixing agents in papermaking.

In addition, WO-A-98/50630 discloses fixing agents which are obtainable by reacting polymers containing vinylamine or ethylenimine units with reactive sizes for paper, such as long-chain alkylketene dimers, long-chain alkyl- or alkenylsuccinic anhydrides, chloroformic esters of fatty alcohols or $C_{12}$- to $C_{36}$-alkyl isocyanates.

WO-A-94/12560 describes condensates which are obtainable by partial amidation of polyalkylenepolyamines with carboxylic acids or derivatives thereof and subsequent crosslinking of the partially amidated polyalkyleneamines with at least bifunctional crosslinking agents, from 0.001 to 10 parts by weight of a crosslinking agent being used per part by weight of the partially amidated polyalkylenepolyamines. The condensates are used as drainage aids, flocculants and retention aids and as fixing agents in papermaking.

WO-A-01/40578 discloses the use of water repellent copolymers as drainage aids in papermaking. The polymers are obtained by copolymerization of hydrophobic monomers with one or more other ethylenically unsaturated monomers.

It is an object of the present invention to provide novel substances.

We have found that this object is achieved, according to the invention, by a hydrophobically modified polymer containing vinylamine or ethylenimine units and obtainable by reacting (a) polymers containing vinylamine or ethylenimine units with (b) compounds of the formula $$R\text{-}A\text{-}(EO, PO, BuO)_n\text{---}X \qquad (I),$$

where

R is $C_4$- to $C_{26}$-alkyl, $C_4$- to $C_{26}$-alkenyl, $C_4$- to $C_{26}$-hydroxyalkyl or $C_4$- to $C_{26}$-alkylcarboxyl, A is —O—, —NH— or —COO—, EO is an ethylene oxide unit, PO is a propylene oxide unit, BuO is a butylene oxide unit, n is from 1 to 250 and X is a functional group which can be covalently bonded to an OH group.

The compounds of the formula I are obtainable, for example, by first alkoxylating saturated or ethylenically unsaturated, monohydric $C_4$- to $C_{26}$-alcohols with ethylene oxide, propylene oxide and/or butylene oxide, from 1 to 250, preferably from 10 to 100, mol of an alkylene oxide, preferably ethylene oxide alone or ethylene oxide and propylene oxide or propylene oxide and ethylene oxide in succession, being used per mole of an alcohol.

In a second process step, the functional group X is then bonded to the alkoxylation products by reacting the alkoxylated alcohols with bifunctional compounds, such as epihalohydrins, preferably epichlorohydrin, 2-halo acid halides, preferably 2-chloroacetyl chloride, diisocyanates, such as tolylene 2,4-diisocyanate, isophorone diisocyanate and trimethylhexane diisocyanate, or cyclic carboxylic anhydrides, such as maleic anhydride, succinic anhydride or phthalic anhydride. For example, with the use of epichlorohydrin under acidic reaction conditions, the compounds mentioned below form as the main product, in which the substituents have the meanings stated in the formula I and Hal. is halogen:

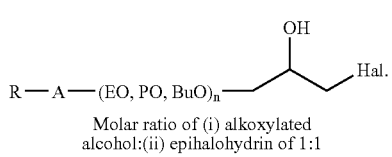

Ia

Molar ratio of (i) alkoxylated alcohol:(ii) epihalohydrin of 1:1

-continued

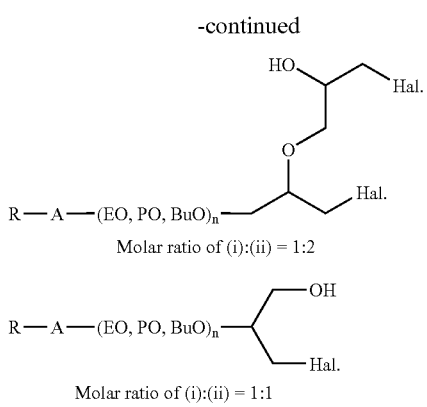

Molar ratio of (i):(ii) = 1:2

Ib

Molar ratio of (i):(ii) = 1:1

Ic

In an alkaline reaction medium, for example, the following structures form from the (i) alkoxylated alcohols and (ii) epihalohydrins:

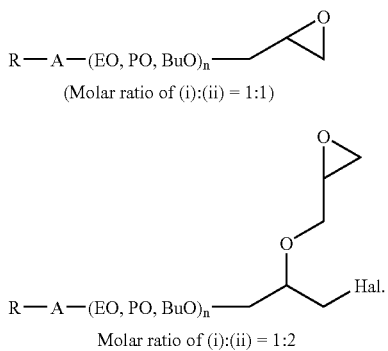

(Molar ratio of (i):(ii) = 1:1)

Id

Molar ratio of (i):(ii) = 1:2

Ie

In the reaction of (i) alkoxylated alcohols with (ii) 2-halocarboxylic acid halides in a molar ratio of 1:1, compounds I having the following structure form:

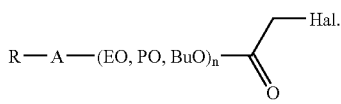

If

The reaction of (i) alkoxylated alcohols with (ii) cyclic carboxylic anhydrides in a molar ratio of 1:1 gives compounds of the following structure

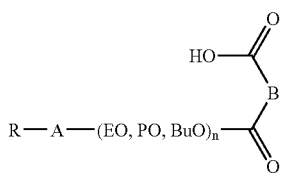

Ig where B is alkylene, alkenylene or arylene, e.g. B is —$CH_2$—$CH_2$— (starting from succinic anhydride) or B is $C_6H_4$ (starting from phthalic anhydride).

The reaction of (i) alkoxylated alcohols with (i) diisocyanates, which have a different reactivity, gives the following compounds:

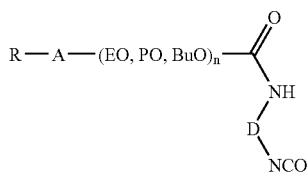

where D is alkylene, alkenylene or arylene,

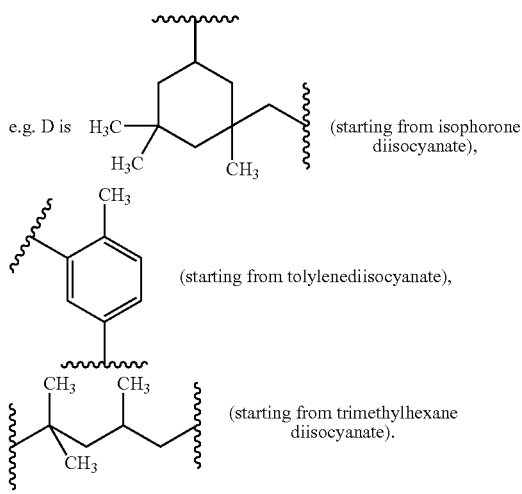

e.g. D is (starting from isophorone diisocyanate), (starting from tolylenediisocyanate), (starting from trimethylhexane diisocyanate).

The compounds of the formula I which are thus obtainable are then reacted with at least one polymer of group (a), the polymers rendered water repellent according to the invention then being obtained. The polymers of group (a) can be reacted with a water repellent of group (b) or with two or more such water repellents simultaneously or in succession.

We have found that the object of the invention is also achieved by a process for the preparation of hydrophobically modified polymers containing vinylamine or ethylenimine units by reacting polymers containing vinylamine or ethylenimine units with water repellents, if the water repellent used is at least one compound of the formula R-A-(EO, PO, BuO)$_n$—X          (I)

where
R is $C_4$- to $C_{26}$-alkyl, $C_4$- to $C_{26}$-alkenyl, $C_4$- to $C_{26}$-hydroxyalkyl or $C_4$- to $C_{26}$-alkylcarboxyl,
A is —O—, —NH— or —COO—,
EO is an ethylene oxide unit,
PO is a propylene oxide unit,
BuO is a butylene oxide unit,
n is from 1 to 250 and
X is a functional group which can be covalently bonded to an OH group.

A hydrophobic modification of the cationic polymers is possible, for example, by reacting (a) polymers containing vinylamine or ethylenimine units with (b) the reaction products of (i) alkoxylated, monohydric $C_4$- to $C_{26}$-alcohols, alkoxylated $C_4$- to $C_{26}$-alkylamines or alkoxylated $C_4$- to $C_{26}$-carboxylic acids with (ii) epihalohydrins, 2-halocarboxylic acid halides, mixed dihaloalkylenes, diisocyanates or cyclic acid anhydrides in a molar ratio (i):(ii) of from 0.2:1.0 to 1.0:1.0.

Suitable components (b) are preferably the reaction products of (i) monohydric $C_{14}$- to $C_{22}$-alcohols with (ii) epichlorohydrin, chloroacetyl chloride, tolylene 2,4-diisocyanate, isophorone diisocyanate, trimethylhexane diisocyanate, succinic anhydride or maleic anhydride. Particularly preferred water repellents of component (b) are the reaction products of (i) palmityl alcohol, stearyl alcohol, oleyl alcohol, tallow fatty alcohol or a mixture of the alcohols with (ii) epichlorohydrin. In the preparation of the water repellents of component (b), the molar ratio (i):(ii) is preferably from 1.0:1.0 to 1.0:2.5. The degree of water repellency, based on vinylamine and/or ethylenimine units in the polymers (a), is, for example, from 0.1 to 150, preferably from 0.5 to 30, % by weight. The components (a) and (b) are used in most cases in a ratio such that the degree of water repellency, based on vinylamine and/or ethylenimine units in the polymers (a), is from 1 to 20% by weight.

The present invention also relates to the use of the polymers containing vinylamine or ethylenimine units and rendered water repellent according to the invention as additives to the paper stock in papermaking. The water repellent polymers containing vinylamine or ethylenimine units act, for example, as retention aids and flocculants. However, they may also additionally or only effect fixing of interfering substances to the paper fibers. They are added to the paper stock, for example, in amounts of from 0.003 to 1.0, preferably from 0.03 to 0.5, % by weight, based on dry paper stock.

Polymers containing vinylamine units are known, cf. U.S. Pat. Nos. 4,421,602, 5,334,287, EP-A-0 216 387, U.S. Pat. No. 5,981,689, WO-A-00/63295 and U.S. Pat. No. 6,121,409. They are prepared by hydrolysis of open-chain polymers containing N-vinylcarboxamide units. These polymers are obtainable, for example, by polymerization of N-vinylformamide, N-vinyl-N-methylformamide, N-vinylacetamide, N-vinyl-N-methylacetamide, N-vinyl-N-ethylacetamide or N-vinylpropionamide. Said monomers can be polymerized either alone or together with other monomers.

Suitable monoethylenically unsaturated monomers which are copolymerized with the N-vinylcarboxamides are all compounds copolymerizable therewith. Examples of these are vinyl esters of saturated carboxylic acids of 1 to 6 carbon atoms, such as vinyl formate, vinyl acetate, vinyl propionate and vinyl butyrate, and vinyl ethers, such as $C_1$- to $C_6$-alkyl vinyl ethers, e.g. methyl or ethyl vinyl ether. Further suitable comonomers are esters, amides and nitriles of ethylenically unsaturated $C_3$- to $C_6$-carboxylic acids, for example methyl acrylate, methyl methacrylate, ethyl acrylate and ethyl methacrylate, acrylamide and methacrylamide and acrylonitrile and methacrylonitrile.

Further suitable carboxylic esters are derived from glycols or polyalkylene glycols, in each case only one OH group being esterified, e.g. hydroxyethyl acrylate, hydroxyethyl methacrylate, hydroxypropyl acrylate, hydroxybutyl acrylate, hydroxypropyl methacrylate, hydroxybutyl methacrylate and acrylic monoesters of polyalkylene glycols having a molar mass of from 500 to 10 000. Further suitable comonomers are esters of ethylenically unsaturated carboxylic acids with amino alcohols, for example dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, dimethylaminobutyl acrylate and diethylaminobutyl acrylate. The basic acrylates can be used in the form of the free bases, of the salts with mineral acids, such as hydrochloric acid, sulfuric acid or nitric acid, of the salts with organic acids, such as formic acid, acetic acid, propionic acid or the sulfonic acids, or in quaternized form. Suitable quaternizing agents are, for example, dimethyl sulfate, diethyl sulfate, methyl chloride, ethyl chloride and benzyl chloride.

Further suitable comonomers are amides of ethylenically unsaturated carboxylic acids, such as acrylamide and methacrylamide, and N-alkylmono- and diamides of monoethylenically unsaturated carboxylic acids having alkyl radicals of 1 to 6 carbon atoms, e.g. N-methylacrylamide, N,N-dimethylacrylamide, N-methylmethacrylamide, N-ethylacrylamide, N-propylacrylamide and tert-butyl acrylamide, and basic (meth)acrylamides, e.g. dimethylaminoethylacrylamide, dimethylaminoethylmethacrylamide, diethylaminoethylacrylamide, diethylaminoethylmethacrylamide, dimethylaminopropylacrylamide, diethylaminopropylacrylamide, dimethylaminopropylmethacrylamide and diethylaminopropylmethacrylamide.

Other suitable comonomers are N-vinylpyrrolidone, N-vinylcaprolactam, acrylonitrile, methacrylonitrile, N-vinylimidazole and substituted N-vinylimidazoles, e.g. N-vinyl-2-methylimidazole, N-vinyl-4-methylimidazole, N-vinyl-5-methylimidazole and N-vinyl-2-ethylimidazole, and N-vinylimidazolines, such as N-vinylimidazoline, N-vinyl-2-methylimidazoline and N-vinyl-2-ethylimidazoline. N-Vinylimidazoles and N-vinylimidazolines are used not only in the form of the free bases but also in a form neutralized with mineral acids or organic acids or in quaternized form, the quaternization preferably being carried out with dimethyl sulfate, diethyl sulfate, methyl chloride or benzyl chloride. Diallyldialkylammonium halides are also suitable, e.g. diallyldimethylammonium chloride.

The copolymers contain, for example,
from 99 to 1, preferably from 90 to 10, mol % of at least one N-vinylcarboxamide and
from 1 to 99, preferably from 10 to 90, mol % of other monoethylenically unsaturated monomers copolymerizable therewith in the form of polymerized units. The comonomers are preferably free of acid groups.

In order to prepare polymers containing vinylamine units, it is preferable to start from homopolymers of N-vinylformamide or from copolymers which are obtainable by copolymerization of N-vinylformamide with vinyl formate, vinyl acetate, vinyl propionate, acrylonitrile, N-vinylcaprolactam, N-vinylurea, N-vinylpyrrolidone or $C_1$- to $C_6$-alkyl vinyl ethers and subsequent hydrolysis of the homopolymers or of the copolymers with formation of vinylamine units from the polymerized N-vinylformamide units, the degree of hydrolysis being, for example, from 0.1 to 100, preferably from 10 to 50, mol %. The hydrolysis of the polymers described above is effected by known methods, for example by the action of acids, bases or enzymes. The vinylamine units of the polymers are present as ammonium salt when hydrolysis is effected using acids, whereas the free amino groups form on hydrolysis with bases.

The homopolymers of the N-vinylcarboxamides and their copolymers may be hydrolyzed, for example, to a degree of from 0.1 to 100, preferably from 10 to 50, mol %. In most cases, the degree of hydrolysis of the homo- and copolymers is from 15 to 40 mol %. The degree of hydrolysis of the homopolymers is equivalent to the content of vinylamine units in the polymers. In the case of copolymers which contain vinyl esters as polymerized units, hydrolysis of the ester groups with formation of vinyl alcohol units may occur in addition to the hydrolysis of the N-vinylformamide units. This is the case in particular when the hydrolysis of the copolymers is carried out in the presence of sodium hydroxide solution. Acrylonitrile present as polymerized units is likewise chemically modified during the hydrolysis. Here, for example, amido groups or carboxyl groups form. The homo- and copolymers containing vinylamine units can, if required, contain up to 20 mol % of amidine units which form, for example, by reaction of formic acid with two neighboring amino groups or by intramolecular reaction of an amino group with a neighboring amido group, for example of polymerized N-vinylformamide units. The molar masses of the polymers containing vinylamine units are, for example, from 500 to 10 000 000, preferably from 1000 to 5 000 000 (determined by light scattering). This molar mass range corresponds, for example, to K values of from 5 to 300, preferably from 10 to 250 (determined according to H. Fikentscher in 5% strength aqueous sodium chloride solution at 25° C. and a polymer concentration of 0.5% by weight).

The polymers containing vinylamine units can also be used in salt-free form. Salt-free aqueous solutions of polymers containing vinylamine units can be prepared, for example, from the salt-containing polymer solutions described above with the aid of ultrafiltration through suitable membranes at cut-offs of, for example, from 1000 to 500 000, preferably from 10 000 to 300 000, Dalton. The aqueous solutions of amino- and/or ammonium-containing other polymers are described below and can also be obtained in salt-free form with the aid of ultrafiltration.

According to the invention, derivatives of polymers containing vinylamine units can also be rendered hydrophobic. Thus, it is possible, for example, to prepare a large number of suitable derivatives from the polymers containing vinylamine units by amidation, alkylation, alkoxylation with ethylene oxide, propylene oxide and/or butylene oxide, sulfonamide formation, urea formation, thiourea formation, carbamate formation, acylation, carboxymethylation, phosphonomethylation or Michael addition of the amino groups of the polymer. Of particular interest here are uncrosslinked polyvinylguanidines, which are obtainable by reaction of polymers containing vinylamine units, preferably polyvinylamines, with cyanamide ($R^1R^2N-CN$, where $R^1$ and $R^2$ are H, $C_1$- to $C_4$-alkyl, $C_3$- to $C_6$-cycloalkyl, phenyl, benzyl, alkyl-substituted phenyl or naphthyl), cf. U.S. Pat. No. 6,087,448, column 3, line 64 to column 5, line 14. The derivatization of the polymers containing vinylamine units is effected only partially, for example only up to 80% of the $NH_2$ groups are converted, so that the remaining amino groups can be rendered hydrophobic according to the invention.

The polymers containing vinylamine units include hydrolyzed graft polymers of, for example, N-vinylformamide on polyalkylene glycols, polyvinyl acetate, polyvinyl alcohol, polyvinylformamides, polysaccharides, such as starch, oligosaccharides or monosaccharides. The graft polymers are obtainable by subjecting, for example, N-vinylformamide to free radical polymerization in an aqueous medium in the presence of at least one of said grafting bases, if required together with other copolymerizable monomers, and then hydrolyzing the grafted-on vinylformamide units in a known manner to vinylamine units.

The polymers containing vinylamine units can, if required, also be crosslinked. Crosslinked polymers can be obtained by two different processes. Thus, it is possible, for example, to carry out the polymerization of N-vinylcarboxamides in the presence of a crosslinking agent. Suitable crosslinking agents are monomers which contain at least two ethylenically unsaturated double bonds, e.g. butanediol diacrylate, butanediol dimethacrylate, N,N'-methylenebisacrylamide, divinylurea, divinyldioxane, diacrylates or dimethacrylates of polyethylene glycols having a molar mass of, for example, from 100 to 10 000, preferably from 200 to 500, pentaerythrityl triallyl ether, trimethylolpropane triacrylate and triacrylates or trimethacrylates of alkoxylated trimethylolpropane which has been alkoxylated with from 3 to 90, preferably from 6 to 60, mol of ethylene oxide and/or propylene oxide.

However, polymers containing vinylamine units can also be crosslinked by reacting them with at least bifunctional compounds, such as diepoxides, epihalohydrins, dihaloalkanes and/or dicarboxylic acids. Examples of such crosslinking agents are bischlorohydrin ethers or bisepoxides of polyethylene glycols having molar masses of from 100 to 500, glutaraldehyde, succinic acid or 1,2-dichloroethane.

Polymers containing ethylenimine units are to be understood as meaning polyethylenimines and all polymers which are grafted with ethylenimine. Polyethylenimines are prepared, for example, by polymerization of ethylenimine in aqueous solution in the presence of acid-eliminating compounds, acids or Lewis acids as a catalyst. Polyethylenimines have, for example, molar masses of up to 2.5 million, preferably from 800 to 2 100 000. Polyethylenimines having molar masses of from 800 to 1 750 000 are particularly preferably used. The polyethylenimines can if required be modified, for example alkoxylated, alkylated or amidated. They can moreover be subjected to a Michael addition reaction or to a Stecker synthesis. The polyethylenimine derivatives obtainable thereby are likewise suitable as basic polymers for the preparation of water-absorbing basic polymers.

Polyamidoamines grafted with ethylenimine, which are obtainable, for example, by condensing dicarboxylic acids with polyamines and subsequently grafting on ethylenimine, are also suitable. Suitable polyamidoamines are obtained, for example, by reacting dicarboxylic acids of 4 to 10 carbon atoms with polyalkylenepolyamines which contain from 3 to 10 basic nitrogen atoms in the molecule. Examples of dicarboxylic acids are succinic acid, maleic acid, adipic acid, glutaric acid, suberic acid, sebacic acid and terephthalic acid. In the preparation of the polyamidoamines, mixtures of dicarboxylic acids may also be used, as may mixtures of a plurality of polyalkylenepolyamines. Suitable polyalkylenepolyamines are, for example, diethylenetriamine, triethylenetetramine, tetraethylenepentamine, dipropylenetriamine, tripropylenetetramine, dihexamethylenetriamine, aminopropylethylenediamine and bisaminopropylethylenediamine. The dicarboxylic acids and polyalkylenepolyamines are heated to relatively high temperatures, for example to temperatures in the range of from 120 to 220° C., preferably from 130 to 180° C., for the preparation of the polyamidoamines. The water formed in the condensation is removed from the system. Lactones or lactams of carboxylic acids of 4 to 8 carbon atoms can, if required, also be used in the condensation. For example, from 0.8 to 1.4 mol of a polyalkylenepolyamine can be used per mole of a dicarboxylic acid. These polyamidoamines are grafted with ethylenimine. The grafting reaction is carried out, for example, in the presence of acids or Lewis acids, such as sulfuric acid or boron trifluoride etherates, at, for example, from 80 to 100° C. Compounds of this type are described, for example, in DE-B-24 34 816.

The uncrosslinked or crosslinked polyamidoamines, which, if required, may also additionally have been grafted with ethylenimine before the crosslinking, can also be rendered hydrophobic according to the invention. The crosslinked polyamidoamines grafted with ethylenimine are water-soluble and have, for example, an average molecular weight of from 3000 to 2 000 000 Dalton. Conventional crosslinking agents are, for example, epichlorohydrin and bischlorohydrin ethers of alkylene glycols and polyalkylene glycols.

The K values of the polymers were determined according to H. Fikentscher, Cellulose-Chemie, 13 (1932), 58-64 and 71-74, in 5% strength aqueous sodium chloride solution pH 7, a temperature of 25° C. and a polymer concentration of 0.5% by weight.

In the examples, percentages are by weight unless evident otherwise from the context.

EXAMPLE 1 a) Reaction of an Ethoxylated Long-chain Alcohol with Epichlorohydrin 1.92 g of $BF_3$ diethyl etherate were added to 102 g of an adduct of 25 mol of ethylene oxide with 1 mol of stearyl alcohol. The mixture was heated to 110° C. As soon as this temperature had been reached, 12.9 ml of epichlorohydrin were added in the course of 20 minutes and the reaction mixture was then stirred for 3 hours at 110° C. and for 12 hours at 25° C. The reaction product obtained is the water repellent 1a).

b) Imparting Water Repellency to the Cationic Polymer 1

34.3 g of a 23% strength aqueous solution of the cationic polymer 1 (condensate of diethylenetriamine and adipic acid in the weight ratio of 40:60 as grafting base which had been grafted with ethylenimine in the weight ratio of 1:1 and then crosslinked with a polyethylene oxide-bischlorohydrin crosslinking agent (34 ethylene oxide units, about 55% by weight) and had a total molar mass of 2 000 000) was heated to 60° C. After the stated temperature had been reached, 0.5 g of a melt of the water repellent 1a) was added to this mixture. The reaction mixture was then stirred for 2 hours at 60° C. A viscous aqueous polymer solution having a solids content of 23% was obtained.

EXAMPLE 2 a) Reaction of an Ethoxylated Unsaturated Fatty Alcohol with Epichlorohydrin 2.6 g $BF_3$ diethyl etherate were added to 216 g of an adduct of 22 mol of ethylene oxide with 1 mol of a mixture of oleyl alcohol and palmityl alcohol (weight ratio 60:40) at 75° C. The mixture was heated to 110° C. As soon as the stated temperature had been reached, 17.3 ml of epichlorohydrin were added in the course of 20 minutes and the reaction mixture was then stirred for 10 hours at 110° C. The reaction product obtained is referred to below as water repellent 2a).

b) Imparting Water Repellency to the Cationic Polymer 1 with the Water Repellent 2a)

43 g of the cationic polymer 1 described in example 1 were heated to 80° C.

1.4 g of a melt of the water repellent 2a) were added to this mixture and the reaction mixture was then stirred for 5 hours at 90° C. A viscous aqueous polymer solution having a solids content of about 24% was obtained.

EXAMPLE 3 a) Reaction of an Ethoxylated Fatty Alcohol with Epichlorohydrin 0.96 g of $BF_3$ diethyl etherate was added to 284 g of an adduct of 80 mol of ethylene oxide with 1 mol of stearyl alcohol. The mixture was heated to 110° C., and 6.5 ml of epichlorohydrin were added at this temperature in the course of 25 minutes. The mixture was then stirred for 5 hours at 110° C. The reaction product obtained is referred to below as water repellent 3a).

b) Reaction of the Cationic Polymer 2 with Water Repellent 3a)

79.2 g of a 7.9% strength aqueous solution of the cationic polymer 2 (7.92% strength aqueous solution of a polyvinylformamide hydrolyzed to a degree of 20 mol % and having a K value of 87, i.e. the polymer contained 80 mol % of vinylformamide units and 20 mol % of vinylamine units) were heated to 60° C. After the polymer solution had reached the stated temperature, 0.25 g of a melt of the water repellent 3a) was added to this mixture and the reaction mixture was then stirred for a further 2 hours at 60° C. A viscous aqueous polymer solution was obtained.

The cationic polymers 1 and 2 and the water-repellent cationic polymers 1b)-3b) were tested with regard to their efficiency as retention aids in papermaking. The following stock model was used for this purpose:

|  |  |
|---|---|
|  | 70% of birch sulfate pulp |
|  | 30% of pine sulfate pulp |
|  | about 6.4 g/l |
| Freeness: | ~30° Schopper-Riegler |
| Filler: | calcium carbonate (Hydrocarb OG, OMYA Inc.) |
|  | about 1.6 g/l |

Sample Preparation:

All polymer samples, which had a solids content of 2%, were homogenized for one minute using an Ultra-Turrax T50 (IKA Labortechnik). For use in the retention test, the stock samples were diluted to a solids content of 0.2%.

Retention Measurement:

500 ml of the paper stock were stirred for a short time at 1000 rpm in the Britt Jar test apparatus (Tappi Standard T-261). The polymer solution to be tested was then added. The amounts of polymer added in each case are shown in tables 1 to 3. After an action time of 30 seconds, a small amount of filtrate was removed and discarded, after which 100 g of filtrate were withdrawn. The total retention (FPR) was determined by suction through tared filters (Schleicher & Schuell, grade 589, Weißband) and drying. The dried filters were then ignited in order to determine the ash retention (FPAR). The results obtained in each case are shown in tables 1 to 3.

TABLE 1

| Polymer according to example | Dose [% solid/solid[ | FPR [%] | FPAR [%] |
|---|---|---|---|
| 1b | 0.025 | 79.6 | 22.4 |
| 1b | 0.05 | 81.5 | 32.5 |
| 1b | 0.1 | 82.0 | 36.3 |
| 1b | 0.2 | 82.6 | 36.9 |
| Cationic polymer 1 | 0.025 | 79.6 | 21.2 |
| Cationic polymer 1 | 0.05 | 80.5 | 27.5 |
| Cationic polymer 1 | 0.1 | 80.8 | 29.4 |
| Cationic polymer 1 | 0.2 | 81.1 | 30.6 |

TABLE 2

| Polymer according to example | Dose | FPR [%] | FPAR [%] |
|---|---|---|---|
| 2b | 0.025 | 78.1 | 17.0 |
| 2b | 0.05 | 79.5 | 22.1 |
| 2b | 0.1 | 80.6 | 29.0 |
| 2b | 0.2 | 81.1 | 31.3 |
| Cationic polymer 1 | 0.025 | 75.8 | 8.9 |
| Cationic polymer 1 | 0.05 | 78.1 | 17.0 |
| Cationic polymer 1 | 0.1 | 78.9 | 22.7 |
| Cationic polymer 1 | 0.2 | 79.7 | 27.3 |

TABLE 3

| Polymer according to example | Dose | FPR [%] | FPAR [%] |
|---|---|---|---|
| 3b | 0.025 | 79.2 | 25.3 |
| 3b | 0.05 | 80.2 | 30.7 |
| 3b | 0.1 | 80.9 | 35.0 |
| 3b | 0.2 | 80.3 | 32.0 |
| Cationic polymer 2 | 0.025 | 79.0 | 23.5 |
| Cationic polymer 2 | 0.05 | 79.7 | 26.5 |
| Cationic polymer 2 | 0.1 | 80.5 | 32.0 |
| Cationic polymer 2 | 0.2 | 80.7 | 30.7 |

We claim:

1. A hydrophobically modified polymer comprising vinylamine or ethylenimine units, which is obtained by reacting
   (a) a polymer comprising vinylamine or ethylenimine units with
   (b) a compound of the formula $$R\text{-}A\text{-}(AO)_n\text{-}X \quad (I),$$

where
   R is $C_4$- to $C_{26}$-alkyl or $C_4$- to $C_{26}$-alkenyl,
   A is —O—, —NH— or —COO—,
   AO is at least one alkylene oxide selected from the group consisting of EO, PO and BuO wherein,
   EO is an ethylene oxide unit,
   PO is a propylene oxide unit,
   BuO is a butylene oxide unit,
   n is from 1 to 250 and
   X is a functional group which can be covalently bonded to an OH group.

2. An additive to paper stock in papermaking which comprises said hydrophobically modified polymer as claimed in claim 1.

3. A process for the preparation of a hydrophobically modified polymer comprising vinylamine or ethylenimine units, said process comprising: reacting a polymer comprising vinylamine or ethylenimine units with a water repellent, wherein the water repellent is at least one compound of the formula $$R\text{-}A\text{-}(AO)_n\text{-}X \quad (I)$$

where
   R is $C_4$- to $C_{26}$-alkyl, $C_4$- to $C_{26}$-alkenyl, $C_4$- to $C_{26}$-hydroxyalkyl or $C_4$- to $C_{26}$-alkylcarboxyl,
   A is —O—, —NH— or —COO—,
   AO is at least one alkylene oxide selected from the group consisting of EO, PO and BuO wherein,
   EO is an ethylene oxide unit,
   PO is a propylene oxide unit,
   BuO is a butylene oxide unit,
   n is from 1 to 250 and
   X is a functional group which can be covalently bonded to an OH group.

4. The process as claimed in claim 3, wherein
   (a) said polymer comprising vinylamine or ethylenimine units is reacted with
   (b) one or more reaction products of (i) one or more alkoxylated monohydric $C_4$- to $C_{26}$-alcohols, one or more alkoxylated $C_4$- to $C_{26}$-alkylamines, or one or more alkoxylated $C_4$- to $C_{26}$-carboxylic acids with (ii) one or more epihalohydrins, one or more 2-halocarboxylic acid halides, one or more mixed dihaloalkylenes, one or more diisocyanates, or one or more cyclic acid anhydrides in a molar ratio (i):(ii) of from 0.2:1.0 to 1.0:1.0.

5. The process as claimed in claim 4, wherein component (b) is one or more reaction products of (i) one or more alkoxylated monohydric $C_{14}$- to $C_{22}$-alcohols with (ii) epichlorohydrin, chloroacetyl chloride, tolylene 2,4-diisocyanate, isophorone diisocyanate, trimethylhexane diisocyanate, succinic anhydride or maleic anhydride.

6. The process as claimed in claim 4, wherein said component (b) is one or more reaction products of (i) alkoxylated palmityl alcohol, alkoxylated stearyl alcohol, alkoxylated oleyl alcohol, alkoxylated tallow fatty alcohol or mixtures thereof with (ii) epichlorohydrin.

7. The process as claimed in claim 3, wherein the degree of water repellency, based on vinylamine or ethylenimine units in the polymers (a), is from 0.1 to 150% by weight.

8. The process as claimed in claim 3, wherein the degree of water repellency, based on vinylamine or ethylenimine units in the polymers (a), is from 1 to 20% by weight.

* * * * *